United States Patent
Sasaki et al.

(10) Patent No.: US 11,373,673 B2
(45) Date of Patent: Jun. 28, 2022

(54) SOUND INSPECTION SYSTEM AND SOUND INSPECTION METHOD

(71) Applicant: Hitachi, Ltd., Tokyo (JP)

(72) Inventors: Reiso Sasaki, Tokyo (JP); Takuma Nishimura, Tokyo (JP); Takahiro Yamada, Tokyo (JP); Tsukasa Fujimori, Tokyo (JP)

(73) Assignee: HITACHI, LTD., Tokyo (JP)

( * ) Notice: Subject to any disclaimer, the term of this patent is extended or adjusted under 35 U.S.C. 154(b) by 15 days.

(21) Appl. No.: 16/972,763

(22) PCT Filed: Mar. 1, 2019

(86) PCT No.: PCT/JP2019/008031
§ 371 (c)(1),
(2) Date: Dec. 7, 2020

(87) PCT Pub. No.: WO2020/054102
PCT Pub. Date: Mar. 19, 2020

(65) Prior Publication Data
US 2021/0241784 A1  Aug. 5, 2021

(30) Foreign Application Priority Data
Sep. 14, 2018  (JP) .............................. JP2018-172931

(51) Int. Cl.
*G10L 25/51* (2013.01)
*G01H 17/00* (2006.01)
(Continued)

(52) U.S. Cl.
CPC .............. *G10L 25/51* (2013.01); *G01H 17/00* (2013.01); *G01M 99/00* (2013.01);
(Continued)

(58) Field of Classification Search
None
See application file for complete search history.

(56) References Cited

U.S. PATENT DOCUMENTS

2008/0304672 A1* 12/2008 Yoshizawa ............ G10L 21/028
381/56
2015/0043737 A1* 2/2015 Abe ........................ G10L 25/18
381/56
(Continued)

FOREIGN PATENT DOCUMENTS

JP  09-166483 A  6/1997
JP  11-083618 A  3/1999
(Continued)

OTHER PUBLICATIONS

International Search Report of PCT/JP2019/008031 dated May 7, 2019.

*Primary Examiner* — Qin Zhu
(74) *Attorney, Agent, or Firm* — Mattingly & Malur, PC

(57) ABSTRACT

A sound inspection system that can reduce power consumption is provided. A sound inspection system 1 that determines a state based on a sound of an inspection target object 2 includes a sound sensor device 10 that collects the sound of the inspection target object 2, analyzes the collected sound, and transmits an analysis result, and a sound data determination device 30 that determines a state of the inspection target object based on the analysis result from the sound sensor device. The sound sensor device transmits, as the analysis result, intensities of the collected sound for each predetermined frequency set in advance.

6 Claims, 6 Drawing Sheets

(51) Int. Cl.
    *G01M 99/00*     (2011.01)
    *G05B 23/02*     (2006.01)
    *G08B 3/10*     (2006.01)
    *G10L 25/72*     (2013.01)
    *H04R 1/08*     (2006.01)
    *H04R 3/00*     (2006.01)
    *G01H 3/06*     (2006.01)
    *G01H 3/12*     (2006.01)
    *G01M 5/00*     (2006.01)
    *G08B 1/08*     (2006.01)
    *H04R 29/00*     (2006.01)

(52) U.S. Cl.
    CPC ............ *G05B 23/0221* (2013.01); *G08B 3/10* (2013.01); *G10L 25/72* (2013.01); *H04R 1/08* (2013.01); *H04R 3/00* (2013.01); *H04R 2420/07* (2013.01)

(56) References Cited

U.S. PATENT DOCUMENTS

| | | | |
|---|---|---|---|
| 2015/0139430 A1* | 5/2015 | Miyata | H04R 29/00 |
| | | | 381/56 |
| 2017/0034827 A1 | 2/2017 | Naiki et al. | |
| 2017/0195823 A1 | 7/2017 | Shinohara | |
| 2019/0243351 A1* | 8/2019 | Okita | G05B 23/0275 |
| 2021/0255613 A1* | 8/2021 | Mizobuchi | G05B 23/024 |

FOREIGN PATENT DOCUMENTS

| | | |
|---|---|---|
| JP | 2009-273113 A | 11/2009 |
| JP | 2017-032275 A | 2/2017 |
| JP | 2017-122976 A | 7/2017 |
| JP | 2017-134836 A | 8/2017 |

\* cited by examiner

SOUND INSPECTION SYSTEM AND SOUND INSPECTION METHOD

TECHNICAL FIELD

The present invention relates to a sound inspection system and a sound inspection method.

BACKGROUND ART

On a work site such as a power plant, chemical plant, or a steel plant, a worker may hear an operating sound of equipment and may determine whether or not the operating sound is normal. However, the worker needs experience to be able to distinguish abnormal sounds. Further, since the worker inspects the equipment by ears while walking around a large site, a burden on the worker is heavy. In recent years, the aging of skilled workers has progressed, and it is difficult to secure new workers. Thus, as described in PTL 1, a system that detects acoustic data of a monitoring target object by a microphone and wirelessly transmits the detected data to a monitoring processing device at a location away from the monitoring target object has been proposed.

CITATION LIST

Patent Literature

PTL 1: JP 2009-273113 A

SUMMARY OF INVENTION

Technical Problem

In the related art described in PTL 1, the monitoring processing device calculates a frequency spectrum from the acoustic data received from the monitoring device on the site, and detects an abnormality in the monitoring target object by a neural network model (paragraph 0066 in PTL 1). However, although a data size differs depending on a frequency to be measured and the like, in general, sound data has a large data size as it is. Thus, processing of measurement and analysis is a heavy task, and a power consumption increases.

When a sensor device is installed in on-site equipment of the plant by a so-called retrofitting, it is difficult to obtain a wired power supply. Accordingly, since the sensor device operates by using a built-in battery as a power source, the battery runs out immediately when processing that consumes a large amount of power is executed. Thus, the battery must be replaced frequently, resulting in low usability.

The present invention has been made in view of the above-described problems, and an object of the present invention is to provide a sound inspection system and a sound inspection method capable of reducing power consumption.

Solution to Problem

In order to solve the above problems, a sound inspection system according to the present invention is a sound inspection system that determines a state based on a sound of an inspection target object. The sound inspection system includes a sound sensor device that collects the sound of the inspection target object, analyzes the collected sound, and transmits an analysis result, and a sound data determination device that determines a state of the inspection target object based on the analysis result from the sound sensor device. The sound sensor device transmits, as the analysis result, intensities of the collected sound for each predetermined frequency set in advance.

Advantageous Effects of Invention

According to the present invention, since intensities for each predetermined frequency are transmitted as an analysis result instead of transmitting the entire data of a frequency band of a collected sound as the analysis result, a data size can be reduced and power consumption can be reduced.

DESCRIPTION OF EMBODIMENTS

Figure 1:
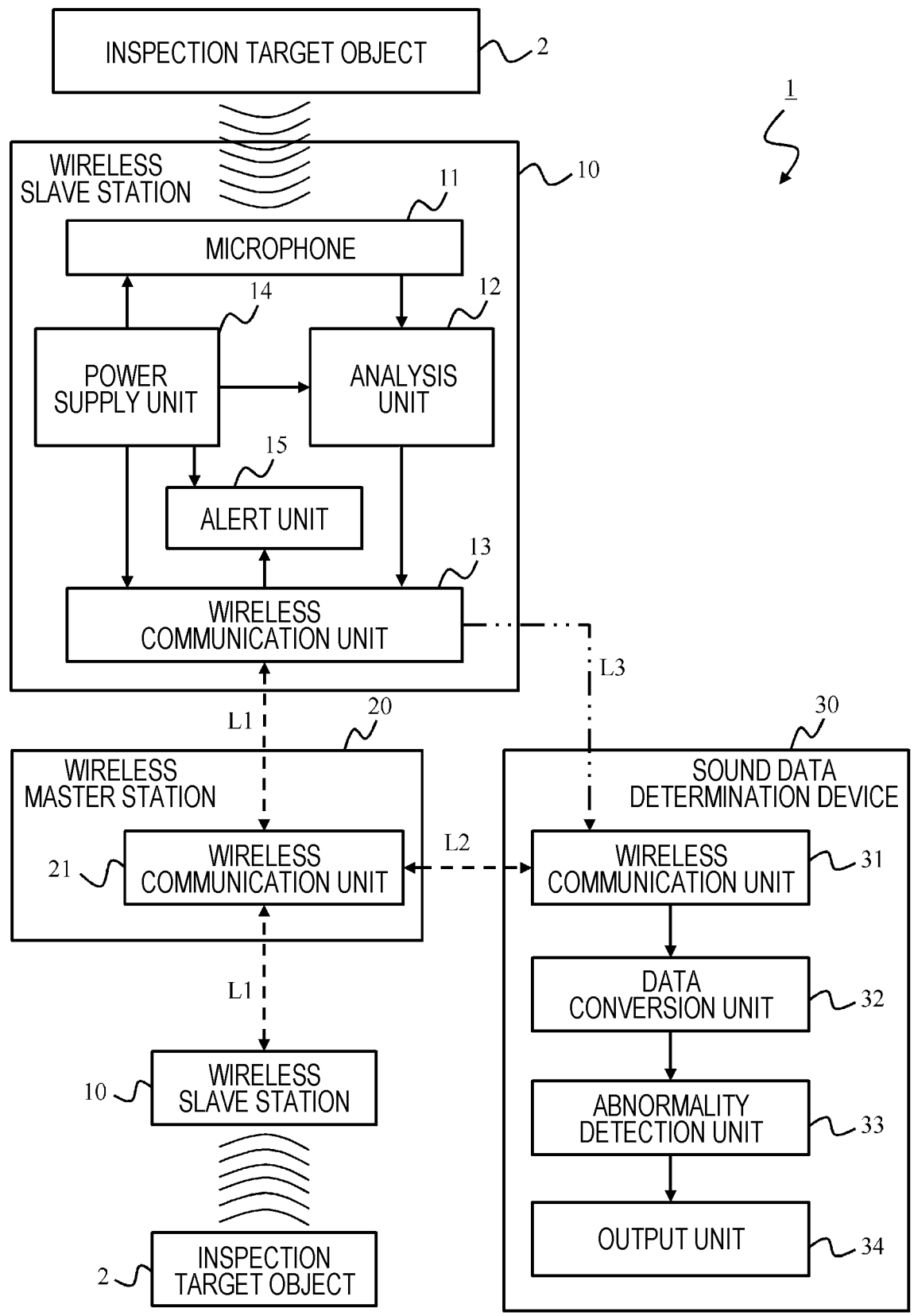
FIG. 1 is an overall explanatory diagram of a sound inspection system according to a first embodiment.

Hereinafter, embodiments of the present invention will be described with reference to the drawings. In the present embodiment, as will be described in detail below, sound (operating sound) data generated at on-site equipment of a plant is collected, the collected sound data is analyzed, and intensities of the sound data for each predetermined frequency as an analysis result is transmitted to a determination device.

In the present embodiment, a microphone 11 is provided in a wireless slave station 10, the microphone 11 is activated at regular time intervals, and the operating sound of equipment 2 as an inspection target is collected. The wireless slave station 10 analyzes the collected operating sound data, and transmits the intensities of the operating sound for each predetermined frequency as the analysis result to a sound data determination device 30. The wireless slave station 10 is intermittently driven and data having a minimum size is transmitted and, thus, power consumption can be reduced. Accordingly, a state of the equipment 2 can be remotely monitored for a long period of time by expanding a lifespan of a power supply unit 14 of the wireless slave station 10, and operation cost can be reduced.

First Embodiment

A first embodiment will be described with reference to FIGS. 1 to 6. FIG. 1 illustrates an overall configuration diagram of a sound inspection system 1. The sound inspection system 1 of the present embodiment is applied to, for example, a plant such as a power plant, a chemical plant, or a steel plant.

The equipment 2 that generates sounds such as a motor, a pump, a compressor, a turbine, and a boiler is provided in the plant. At least a part of the equipment 2 that generates these sounds becomes a monitoring target (inspection target) of the sound inspection system 1. Hereinafter, the equipment 2 as the monitoring target is referred to as an inspection target object 2.

The wireless slave station 10 is provided in the vicinity of the inspection target object 2. The wireless slave station 10 may be provided in contact with the inspection target object 2 or may be provided away from the inspection target object 2. A plurality of the wireless slave stations 10 may be provided in one inspection target object 2.

The wireless slave station 10 as a "sound sensor device" includes, for example, the microphone 11, an analysis unit 12, a wireless communication unit 13, a power supply unit 14, and an alert unit 15. Here, although the device in which a sensor function and a wireless communication function are integrated is illustrated, the sensor function and the wireless communication function provided separately may be connected.

The microphone 11 collects the sound emitted by the inspection target object 2, and outputs the collected sound as an electrical signal. The electrical signal output by the microphone 11 is input to the analysis unit 12. As will be described later, the analysis unit 12 analyzes the intensities for each predetermined frequency of the sound collected by the microphone 11, and sends the analysis result to the wireless communication unit 13.

The wireless communication unit 13 transmits a packet of the analysis result generated by the analysis unit 12 to the sound data determination device 30 by communicating with a wireless communication unit 21 of a wireless master station 20. The packet of the analysis result (to be described later in FIG. 5) is transmitted to the wireless master station 20 as illustrated by a wireless communication path L1, and is further transmitted from the wireless master station 20 to the sound data determination device 30 as illustrated by a wireless communication path L2.

The power supply unit 14 supplies power of a built-in battery to the microphone 11, the analysis unit 12, the wireless communication unit 13, and the alert unit 15 of the wireless slave station 10. Any type of the built-in battery may be used. As in the embodiment to be described later, a power generation unit that supplies a power to the power supply unit 14 may be provided.

The alert unit 15 outputs an alert according to an instruction from the sound data determination device 30. The alert unit 15 calls the attention of a worker who visits for inspection by, for example, turning on an LED lamp (not illustrated). The worker can easily confirm, on a site, the fact that an abnormality occurs in the inspection target object 2 by visually recognizing the alert unit 15. A buzzer may be sounded instead of turning on or on and off the LED lamp.

The wireless master station 20 is a relay device that constitutes a part of a sensor network spreading around the plant. A sound sensor network may be included as a part of the sensor network. In this case, the sensor network may include a sensor network that detects any of a temperature, a humidity, a pressure, a voltage value, a current value, a frequency, a resistance value, a flow rate, a flow velocity, a color, an image, and the like in addition to the sound sensor network that detects and diagnoses an abnormal sound. Alternatively, all sensor networks in the plant may be sound sensor networks.

The wireless master station 20 can wirelessly communicate with the plurality of wireless slave stations 10, and can transmit packets (analysis result data) from respective wireless slave stations 10 to the sound data determination device 30. The packets can also be transferred between the adjacent wireless slave stations 10 by a so-called bucket brigade method.

The sound data determination device 30 may have a function of the wireless master station 20. In this case, the wireless slave station 10 can also directly communicate wirelessly with the sound data determination device 30.

The sound data determination device 30 determines the state of the inspection target object 2 based on the analysis result received from the wireless slave station 10, and outputs a determination result. The sound data determination device 30 may be a computer including, for example, a microprocessor, a main storage device, an auxiliary storage device, an input and output circuit, a communication circuit, a user interface device (all not illustrated), and the like.

The sound data determination device 30 includes, for example, a wireless communication unit 31, a data conversion unit 32, an abnormality detection unit 33, and an output unit 34.

The wireless communication unit 31 is a function of communicating with the wireless master station 20. The data conversion unit 32 is a function of recovering the analysis result by extracting data from the packet of the analysis result received from the wireless slave station 10 and rearranging the data in a predetermined order.

The abnormality detection unit 33 is a function of determining whether or not an abnormal sound deviating from a normal sound is generated based on the recovered analysis result and detecting that an abnormality occurs in the inspection target object 2 based on the presence or absence and degree of the abnormal sound.

The output unit 34 is a function of outputting a detection result (determination result) of the abnormality detection unit 33 to, for example, a display, a printer, a sound synthesizer, or the like. The output unit 34 may notify the worker (including an administrator) of the detection result of the abnormality detection unit 33 through electronic means such as an e-mail. Alternatively, the output unit 34 may notify another device such as a plant control system of the detection result of the abnormality detection unit 33. The output unit 34 can also output an alert from the alert unit 15 by notifying the wireless slave station 10 of the detection result of the abnormality detection unit 33.

Figure 2:
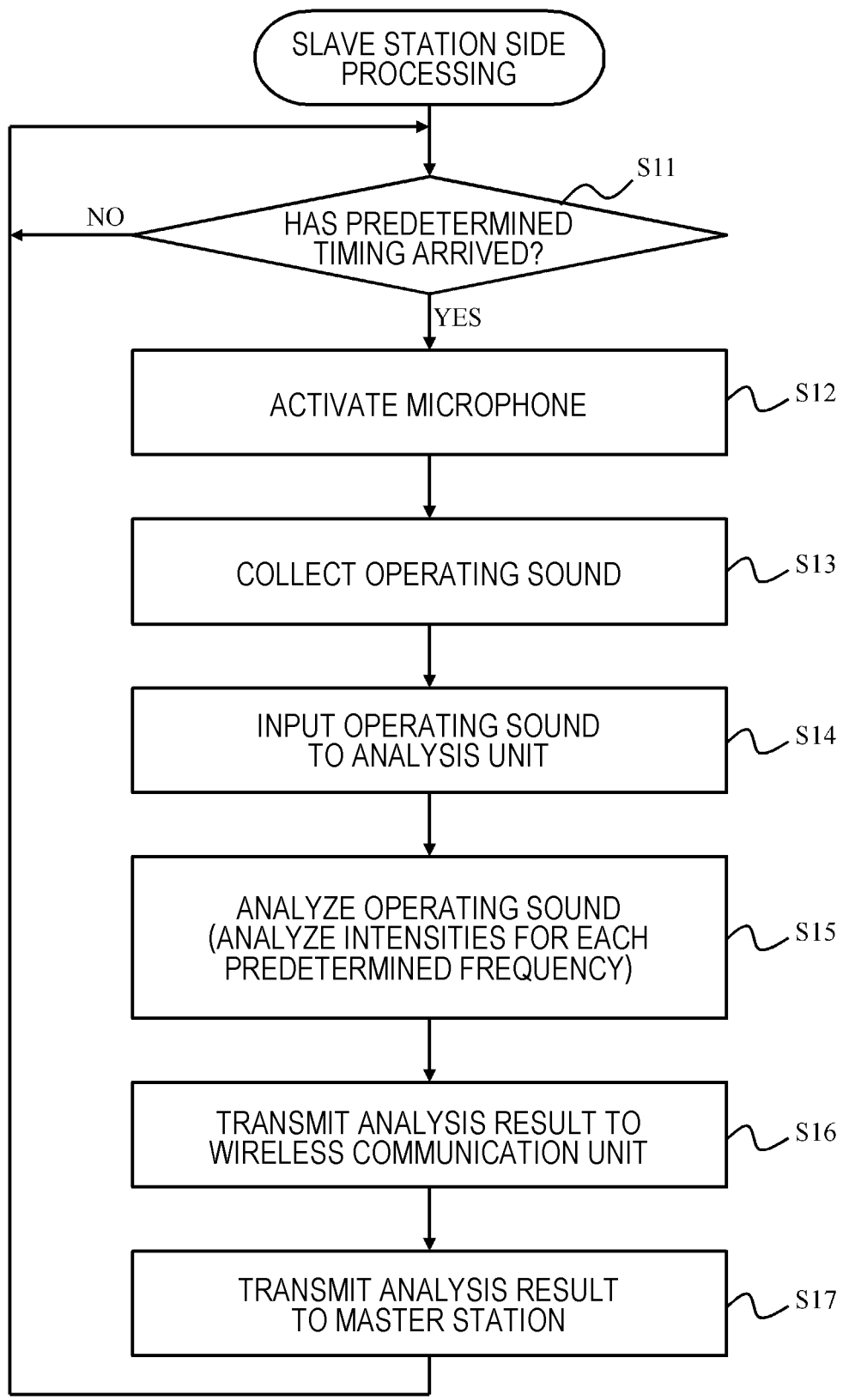
FIG. 2 is a flowchart illustrating processing of a wireless slave station.

FIG. 2 is a flowchart illustrating processing executed by the wireless slave station 10. The wireless slave station 10 monitors whether or not a predetermined timing has arrived (S11), and when the predetermined timing has arrived (S11: YES), the microphone 11 is activated (S12). The predetermined timing may be a fixed cycle or may be irregular. The predetermined timing may be set according to an instruction from the sound data determination device 30.

The microphone 11 collects the operating sound for the inspection target object 2 (S13). The operating sound collected by the microphone 11 and converted into the electrical signal is input to the analysis unit 12 (S14).

The analysis unit 12 analyzes the operating sound input from the microphone 11, and detects, as the analysis result, the intensities for each predetermined frequency set in advance (S15). The analysis unit 12 transmits the analysis result to the wireless communication unit 13 (S16).

The wireless communication unit 13 generates the packet based on the analysis result received from the analysis unit 12, and transmits the packet to the wireless master station 20 (S17).

Figure 3:
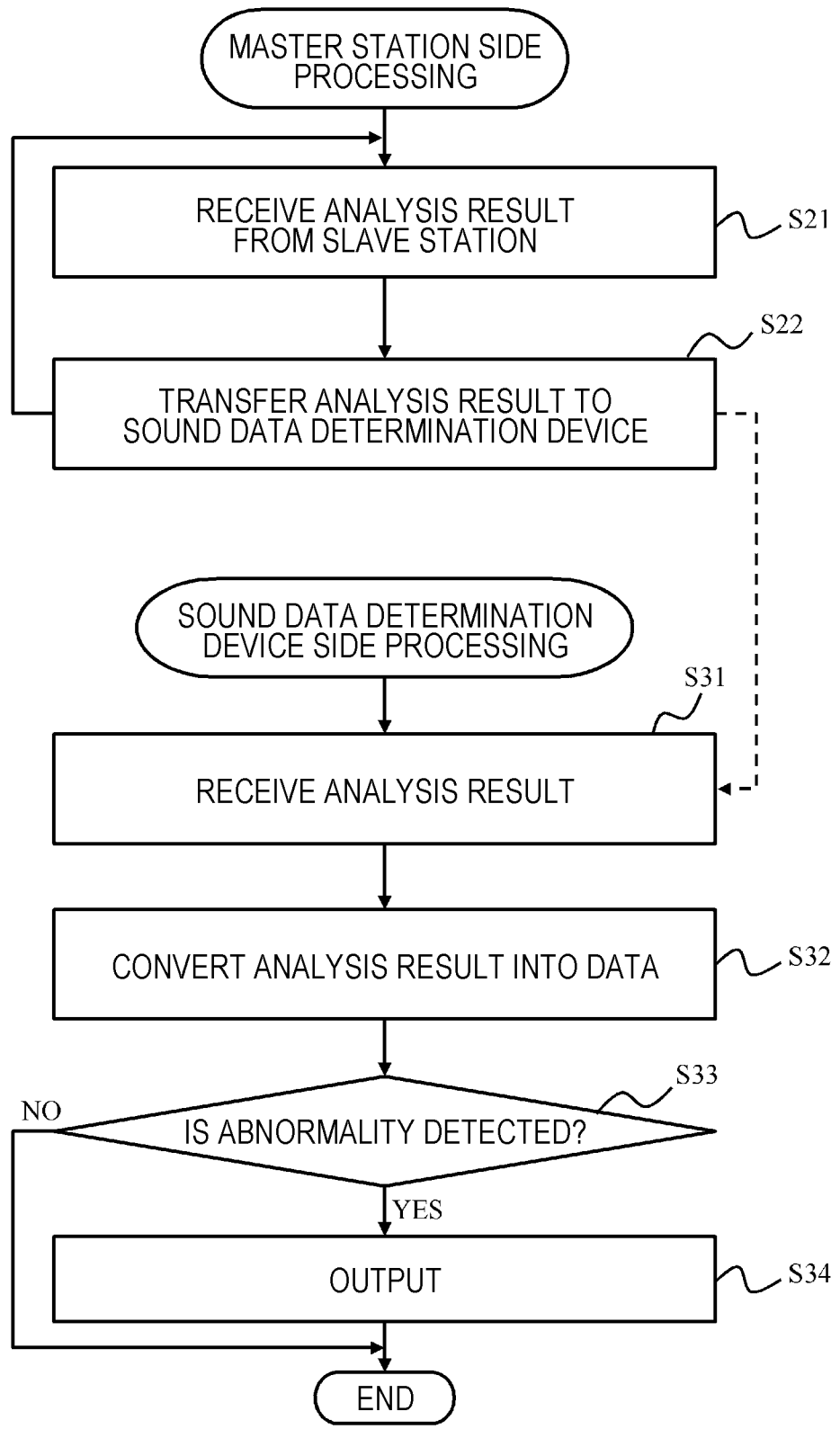
FIG. 3 is a flowchart illustrating processing of a wireless master station and processing of a sound data determination device.

FIG. 3 is a flowchart illustrating processing executed by the wireless master station 20 and processing executed by the sound data determination device 30.

The processing of the wireless master station 20 will now be described first. When the wireless master station 20 receives the packet including the analysis result from the wireless slave station 10 (S21), the wireless master station 20 transfers the packet including the analysis result to the sound data determination device 30 (S22). Since a header of the packet including the analysis result includes a network addressor identification information for specifying the sound data determination device 30 which is a final destination, the packet of the analysis result transmitted from the wireless slave station 10 reaches the sound data determination device 30 even via another device in the middle.

When the packet including the analysis result is received from the wireless slave station 10 via the wireless master station 20 (S31), the sound data determination device 30 extracts the analysis result from the packet, and converts the analysis result into data (S32). The data conversion is to convert the analysis result into time-series data in which the intensities for each predetermined frequency are arranged in order, as illustrated in FIG. 4.

Returning back to FIG. 3, the sound data determination device 30 detects whether or not the abnormality occurs in the inspection target object 2 based on the analysis result converted into the data (S33). When it is determined that the abnormality occurs in the inspection target object 2 (S33: YES), the sound data determination device 30 outputs the determination result (S34). As described above, an output destination of the determination result is, for example, at least one of a user interface device (a display, a printer, or the like) connected to the sound data determination device 30, another device such as a plant management system, and the wireless slave station 10 which is a transmission source of the analysis result serving as a basis for creating the determination result.

When the abnormality in the inspection target object 2 cannot be detected (S33: NO), the sound data determination device 30 ends this processing. The determination result may be output not only when the abnormality is detected in the inspection target object 2 but also when it is determined that the inspection target object 2 is normal.

Figure 4:
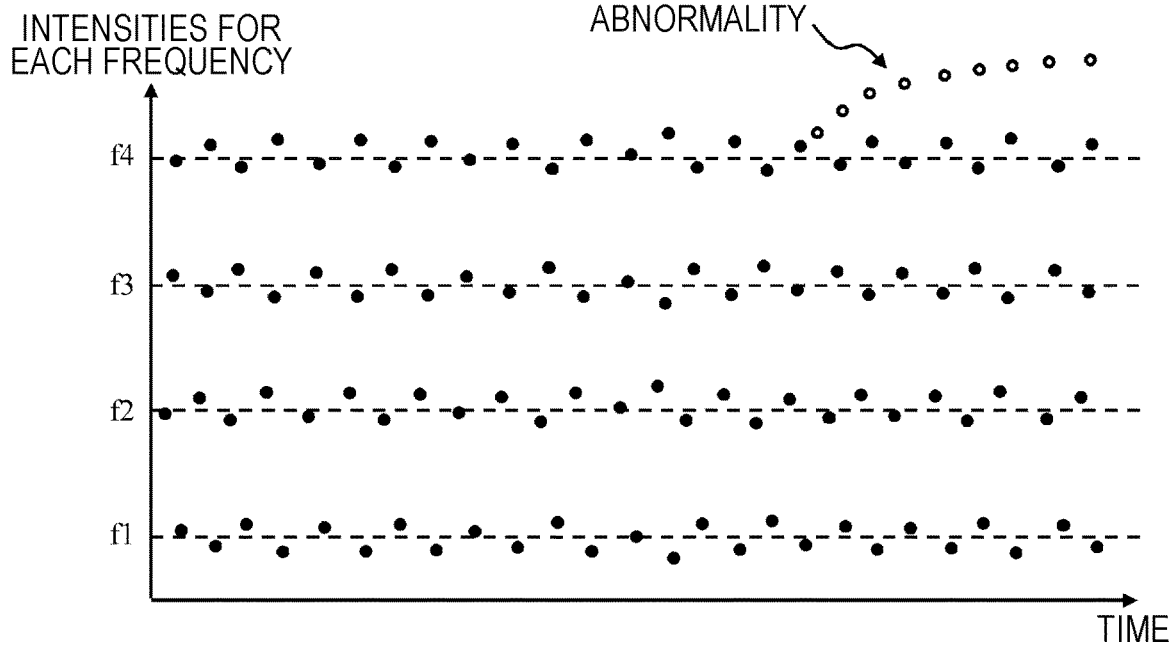
FIG. 4 is a graph illustrating changes in intensities over time for each predetermined frequency.

FIG. 4 is a graph illustrating a structure of the analysis result and how the abnormality is detected. Here, for the sake of convenience in description, a plurality of specific frequencies f1 to f4 is depicted parallelly in one graph; however, each frequency may be depicted in a different graph. A vertical axis of FIG. 4 represents the intensities for each specific frequency, and a horizontal axis of FIG. 4 represents a time.

Although four specific frequencies f1 to f4 are depicted in FIG. 4, the present invention is not limited thereto and three or less or five or more frequencies may be analyzed. A dotted line extending laterally from each frequency indicates, for example, an average value of the intensities.

As illustrated on an upper side of FIG. 4, for example, when the intensities of the frequency f4 deviate from the average value by a predetermined value or more, it is possible to determine that the abnormality occurs. A change in the intensities can be determined from one or a plurality of viewpoints such as a change in a maximum value or a minimum value, a change in the case of differentiation, and a deviation amount in the case of integration. The graph illustrated in FIG. 4 is an example, and the method for detecting the abnormality is not limited to the example described in FIG. 4.

Figure 5:
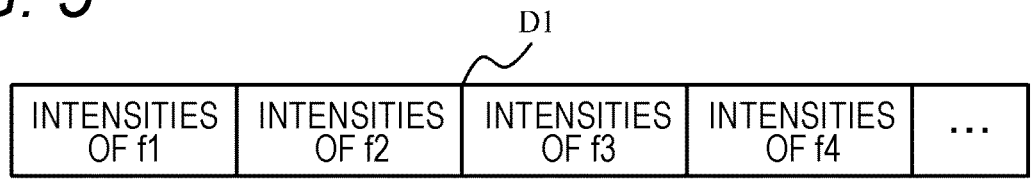
FIG. 5 is an example format of data.

FIG. 5 illustrates a configuration example of a packet D1 including the analysis result. The packet D1 stores the intensities of each of the frequencies f1 to f4. A header or the like storing a destination or the like is added to the packet D1, and the packet is transmitted to the wireless master station 20. The intensities for each predetermined frequency stored in the packet may be an average value of the intensities within a unit time or may be a maximum value within a unit time.

Figure 6:
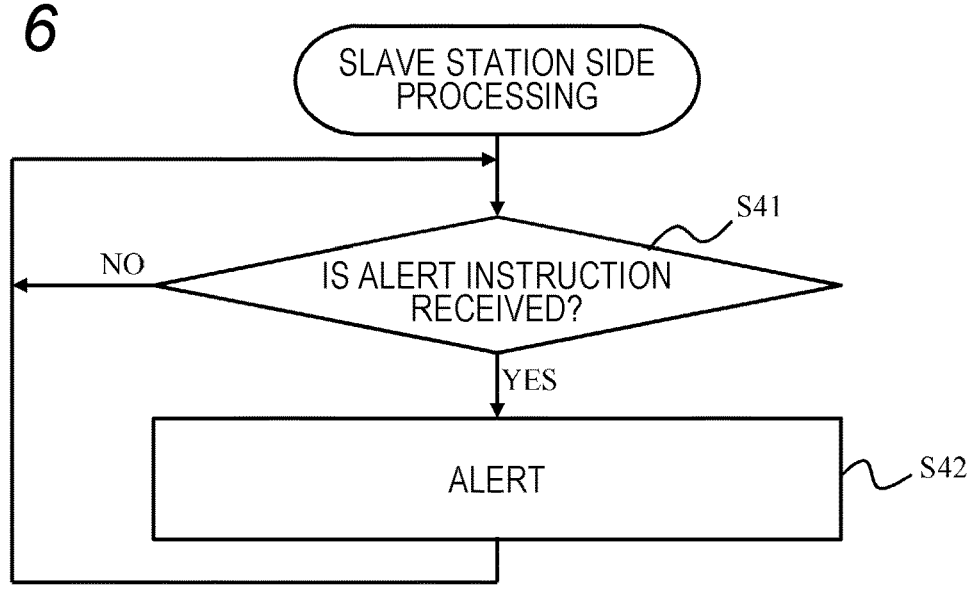
FIG. 6 is a flowchart of processing of outputting an alert by the wireless slave station.

FIG. 6 is a flowchart illustrating alert processing executed by the wireless slave station 10. When the wireless slave station 10 receives an alert instruction from the sound data determination device 30 via the wireless master station 20 (S41), the wireless slave station 10 outputs an alert by turning on an LED lamp or the like (S42).

According to the present embodiment having such a configuration, since only the intensities for a certain predetermined frequency which is a small part thereof is transmitted instead of transmitting the sound data related to the entire frequency band that can be collected by the microphone 11 from the wireless slave station 10 to the sound data determination device 30, a data size of the packet of the analysis result transmitted from the wireless slave station 10 to the sound data determination device 30 can be reduced. Accordingly, since the wireless slave station 10 can reduce power energy required to transmit the analysis result once, it is possible to suppress the consumption of the built-in battery of the power supply unit 14. As a result, frequency of replacing the battery of the wireless slave station 10 can be reduced, and the inspection target object 2 can be monitored for a long period of time. In the sound inspection system 1 of the present embodiment, since the frequency of replacing the battery can be reduced, not only the operation cost of the sound inspection system 1 can be reduced, but also usability is improved.

Second Embodiment

A second embodiment will be described with reference to FIG. 7. The following embodiment including the present embodiment corresponds to a modification example of the first embodiment and, thus, differences from the first embodiment will be mainly described. In the present embodiment, a number of an onomatopoeia is output as the analysis result of the wireless slave station 10.

Figure 7:
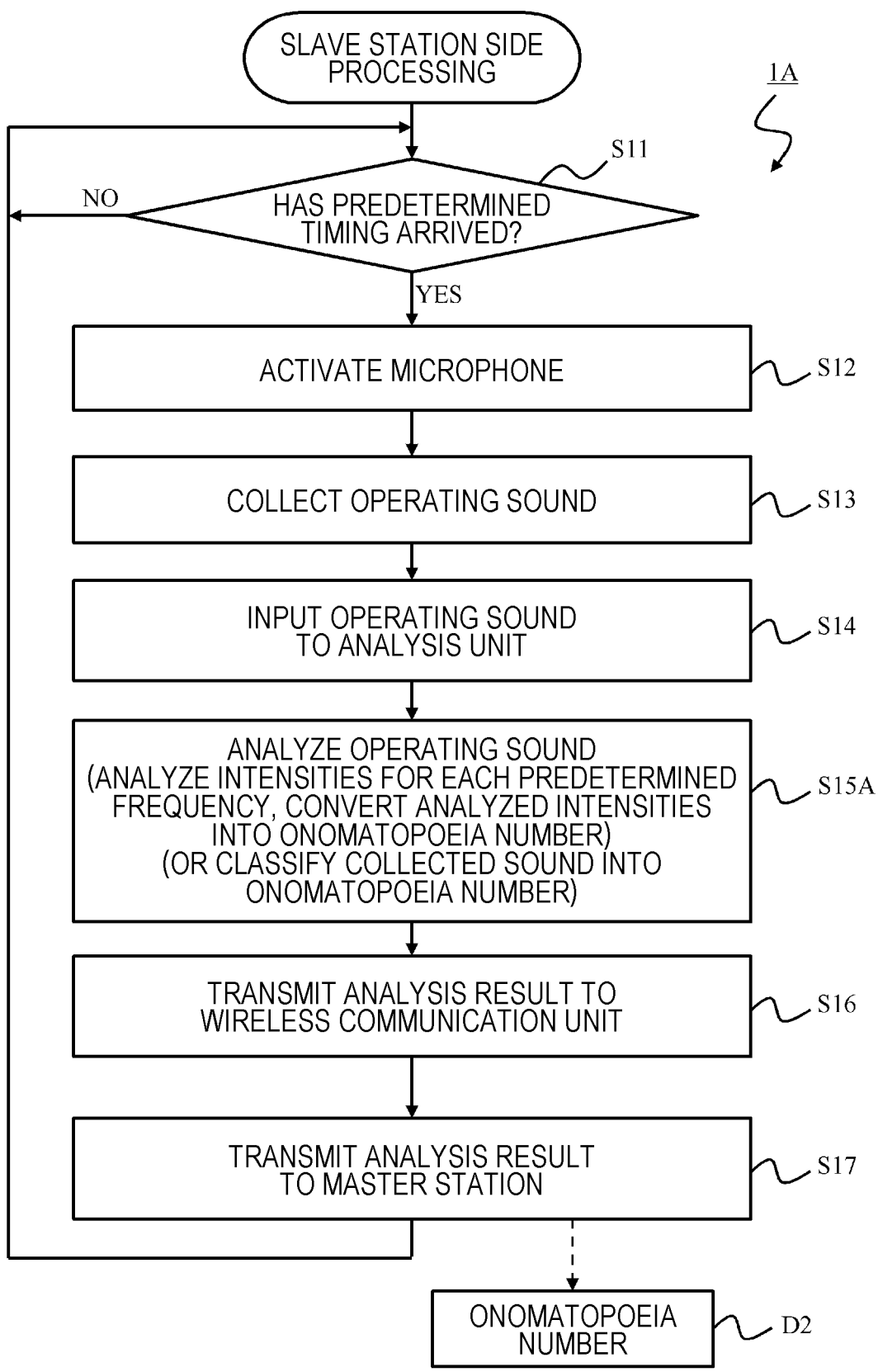
FIG. 7 is a flowchart illustrating processing of a wireless slave station according to a second embodiment.

FIG. 7 is a flowchart illustrating processing of the wireless slave station 10 of a sound inspection system 1A according to the present embodiment. The processing of FIG. 7 includes steps S11 to S14, S16, and S17 among the processing steps described in FIG. 2. In the processing of FIG. 7, Step S15A is different from Step 15 of FIG. 2.

That is, the wireless slave station 10 of the present embodiment specifies an onomatopoeia number that specifies the onomatopoeia of the operating sound by analyzing the intensities for each predetermined frequency (S15A). In the present embodiment, the operating sound for the inspection target object 2 is expressed by the onomatopoeia such as "zaa-zaa", "squawk squawk", or "bump bump". The wireless slave station 10 transmits a packet D2 including a number specifying a type of the onomatopoeia to the sound data determination device 30 via the wireless master station 20 (S16 and S17). It is assumed that information indicating a relationship between the type of the onomatopoeia and the intensities for the frequency is registered, in advance, in the analysis unit 12 of the wireless slave station 10 (not illustrated).

Instep 15A, the operating sounds of the entire frequency band collected by the microphone 11 may be converted into onomatopoeia numbers instead of converting the intensities of each predetermined frequency into the onomatopoeia numbers.

The present embodiment having the aforementioned configuration achieves the same effects as those of the first embodiment. In the present embodiment, instead of transmitting the analysis result of the operating sound as the sound data to the sound data determination device 30, only the corresponding onomatopoeia number is transmitted. Accordingly, the data size can be reduced, and the power consumption of the wireless slave station 10 can be reduced.

Third Embodiment

A third embodiment will be described with reference to FIG. 8. In the present embodiment, a power generation unit 16 is provided in the wireless slave station 10 and, thus, the consumption of the built-in battery of the power supply unit 14 is suppressed.

Figure 8:
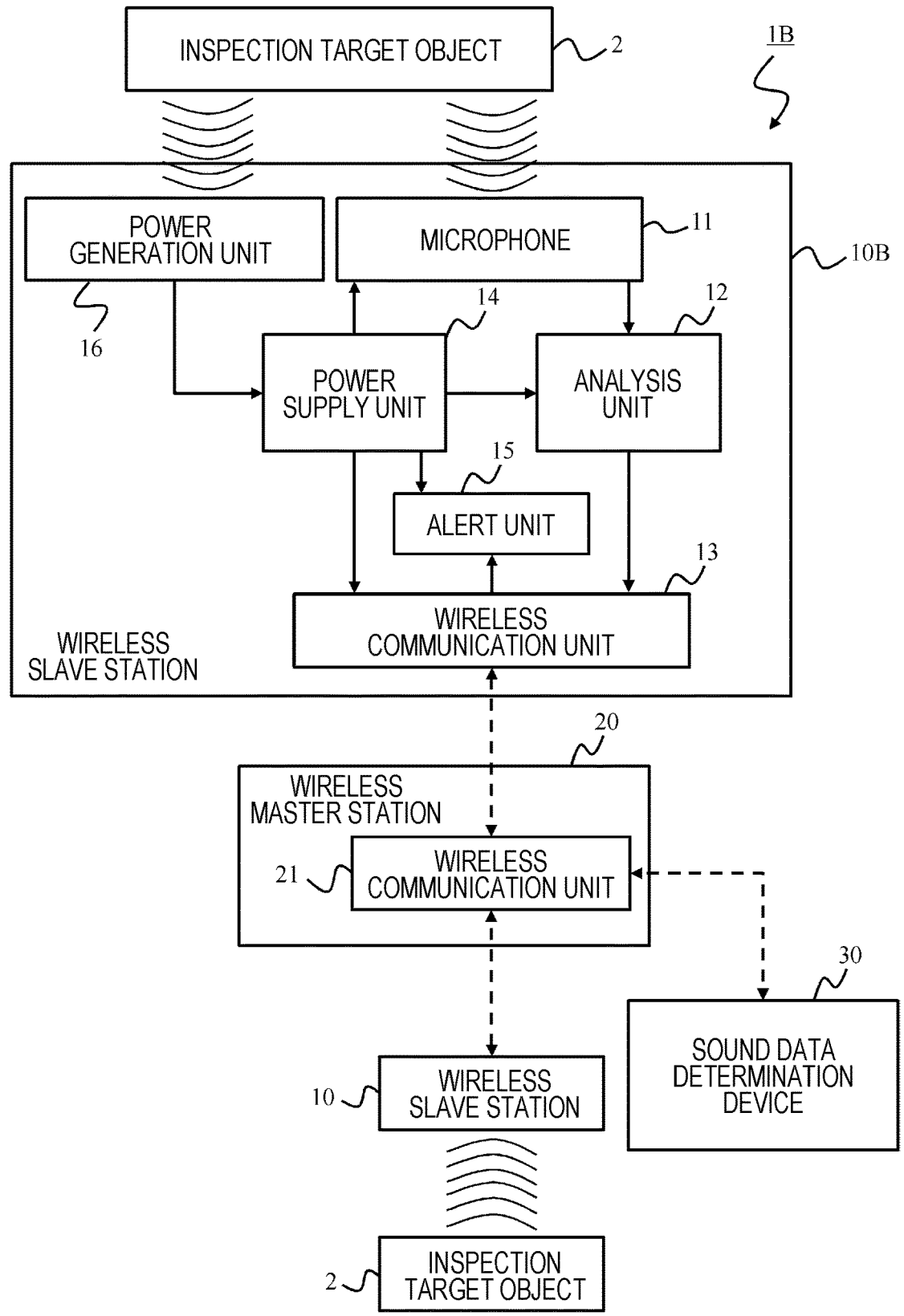
FIG. 8 is an overall explanatory diagram of a sound inspection system according to a third embodiment.

FIG. 8 is an overall explanatory diagram of a sound inspection system 1B according to the present embodiment. A wireless slave station 10B of the present embodiment further includes the power generation unit 16. The power generation unit 16 includes, for example, a piezoelectric vibrator and the like, and is a device that converts a sound or a vibration emitted from the inspection target object 2 into electrical energy. Power generated by the power generation unit 16 is supplied to the power supply unit 14.

The power supply unit 14 can supply both the power received from the power generation unit 16 and the power of the built-in battery to the microphone 11, the analysis unit 12, the wireless communication unit 13, and the alert unit 15. The built-in battery may be a rechargeable secondary battery, and the built-in battery may be charged by the power generated by the power generation unit 16. When the power from the power generation unit 16 is not sufficient, the power from the built-in battery may be supplied. Any power generation method of the power generation unit 16 may be used. However, it is preferable that a power generation method for utilizing energy of, for example, sound and vibration derived from the inspection target object 2 is used.

The present embodiment having the aforementioned configuration achieves the same effects as those of the first embodiment. According to the present embodiment, since the power generation unit 16 is provided, the frequency of replacing the built-in battery of the power supply unit 14 can be further reduced.

The present invention is not limited to the aforementioned embodiments. A person skilled in the art can make various additions and changes to the aforementioned embodiments within the scope of the present invention. In the aforementioned embodiments, the present invention is not limited to the configuration examples illustrated in the accompanying drawings. The configurations and processing methods of the embodiments can be changed appropriately within the scope in which the object of the present invention is achieved.

The components of the present invention can be arbitrarily selected, and an invention having a selected configuration is also included in the present invention. The configurations described in the claims can be combined into combinations other than those specified in the claims.

REFERENCE SIGNS LIST 1, 1A, 1B sound inspection system
2 inspection target object
10, 10B wireless slave station
11 microphone
12 analysis unit
13 wireless communication unit
14 power supply unit
15 alert unit
16 power generation unit
20 wireless master station
21 wireless communication unit
30 sound data determination device
31 wireless communication unit
32 data conversion unit
33 abnormality detection unit
34 output unit

The invention claimed is:

1. A sound inspection system that determines a state based on a sound of an inspection target object, the sound inspection system comprising:
 a sound sensor device that collects the sound of the inspection target object, analyzes the collected sound, and transmits an analysis result; and
 a sound data determination device that determines a state of the inspection target object based on the analysis result from the sound sensor device,
 wherein the sound sensor device transmits, as the analysis result, intensities of the collected sound for each predetermined frequency set in advance, and
 wherein the sound sensor device further includes a power generation unit that converts the sound or a vibration of the inspection target object into power.

2. The sound inspection system according to claim 1, wherein the sound sensor device determines whether or not the collected sound is classified into any onomatopoeia of predetermined onomatopoeias prepared in advance by analyzing the collected sound for the predetermined frequency, and transmits a classification result as the analysis result.

3. The sound inspection system according to claim 1, wherein the sound sensor device further includes an alert unit that outputs an alert according to an instruction from the sound data determination device.

4. The sound inspection system according to claim 1, wherein the sound sensor device is connected so as to be able to wirelessly communicate with the sound data determination device via a wireless master station.

5. The sound inspection system according to claim 1, wherein the sound sensor device is powered by a built-in battery.

6. A sound inspection method for determining a state based on a sound of an inspection target object, the sound inspection method comprising:
 transmitting, as an analysis result, intensities of collected sound for each predetermined frequency from a sound sensor device that collects the sound of the inspection target object to a sound data determination device; and
 determining, by the sound data determination device, a state of the inspection target object based on the analysis sis result received from the sound sensor device,
 wherein the sound sensor device transmits, as the analysis result, intensities of the collected sound for each predetermined frequency set in advance, and
 wherein the sound sensor device converts the sound or a vibration of the inspection target object into power.

* * * * *